US010298952B2

(12) United States Patent
Tian et al.

(10) Patent No.: US 10,298,952 B2
(45) Date of Patent: May 21, 2019

(54) METHODS AND APPARATUS FOR MOTION SKIP MOVE WITH MULTIPLE INTER-VIEW REFERENCE PICTURES

(75) Inventors: Dong Tian, West Windsor, NJ (US); Purvin Bibhas Pandit, Franklin Park, NJ (US); Peng Yin, West Windsor, NJ (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 1363 days.

(21) Appl. No.: 12/733,030

(22) PCT Filed: Jul. 30, 2008

(86) PCT No.: PCT/US2008/009201
§ 371 (c)(1),
(2), (4) Date: Feb. 3, 2010

(87) PCT Pub. No.: WO2009/020542
PCT Pub. Date: Feb. 12, 2009

(65) Prior Publication Data
US 2010/0135391 A1  Jun. 3, 2010

Related U.S. Application Data

(60) Provisional application No. 60/954,256, filed on Aug. 6, 2007.

(51) Int. Cl.
*H04N 19/597* (2014.01)
*H04N 19/573* (2014.01)
(Continued)

(52) U.S. Cl.
CPC ......... *H04N 19/573* (2014.11); *H04N 19/103* (2014.11); *H04N 19/132* (2014.11);
(Continued)

(58) Field of Classification Search
CPC .. H04N 13/0282; H04N 7/014; H04N 7/0157; H04N 19/139; H04N 19/513; H04N 19/521; H04N 19/56
See application file for complete search history.

(56) References Cited

U.S. PATENT DOCUMENTS

| 8,115,804 B2* | 2/2012 | Yang | H04N 19/597 348/47 |
| 8,953,684 B2* | 2/2015 | Cai | H04N 19/597 375/240.16 |
| 2007/0109409 A1 | 5/2007 | Yea et al. | |
| 2010/0316362 A1* | 12/2010 | Jeon | H04N 19/597 386/355 |

FOREIGN PATENT DOCUMENTS

| WO | WO2007011147 | 1/2007 |
| WO | WO2007081756 | 7/2007 |
| WO | WO2008108566 | 9/2008 |

OTHER PUBLICATIONS

Koo et al.: "CE11: MVC Motion Skip Mode," Video Standards and Draft, No. JVT-V069, Jan. 10, 2007.
(Continued)

*Primary Examiner* — Christopher G Findley
(74) *Attorney, Agent, or Firm* — Tutunjian & Bitetto, P.C.

(57) ABSTRACT

There are provided methods and apparatus for motion skip mode with multiple inter-view reference pictures. An apparatus includes an encoder for encoding an image block relating to multi-view video content by performing a selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The encoder extracts motion information for the image block based on at least one of the
(Continued)

inter-view reference picture list, the inter-view reference picture, and disparity vector.

4 Claims, 12 Drawing Sheets

(51) Int. Cl.
  *H04N 19/176*    (2014.01)
  *H04N 19/70*     (2014.01)
  *H04N 19/147*    (2014.01)
  *H04N 19/46*     (2014.01)
  *H04N 19/513*    (2014.01)
  *H04N 19/61*     (2014.01)
  *H04N 19/103*    (2014.01)
  *H04N 19/132*    (2014.01)
  *H04N 19/157*    (2014.01)

(52) U.S. Cl.
  CPC ......... *H04N 19/147* (2014.11); *H04N 19/157* (2014.11); *H04N 19/176* (2014.11); *H04N 19/46* (2014.11); *H04N 19/513* (2014.11); *H04N 19/597* (2014.11); *H04N 19/61* (2014.11); *H04N 19/70* (2014.11)

(56) References Cited

OTHER PUBLICATIONS

Koo et al.: "MVC Motion Skip Mode," Video Standards and Draft, No. JVTW081, Apr. 19, 2007.
Koo et al.: "MVC Decode Simplification of Motion Skip Mode," Joint Video Team (JVT) of ISO/IEC MPEG & ITU-T VCEG, Doc. JVT-X024, Jun. 29, 2007, pp. 1-8.
Chen et al.: "Adaptive Macroblock and Motion Skip Flags for Multi-View Video Coding," Joint Video Team (JVT) of ISO/IEC MPEG & ITU-T VCEG, Doc. JVT-X047, Jun. 29, 2007, pp. 1-27.
Vetro et al.: "Joint Draft 2.0 on Multiview Video Coding," Joint Video Team (JVT) of ISO/IEC MPEG & ITU-T VCEG, Doc. JVT-V209, Jan. 13, 2007, pp. 1-28.
International Search Report, dated Dec. 23, 2008.

* cited by examiner

METHODS AND APPARATUS FOR MOTION SKIP MOVE WITH MULTIPLE INTER-VIEW REFERENCE PICTURES

CROSS-REFERENCE TO RELATED APPLICATIONS

This application claims the benefit, under 35 U.S.C. § 365 of International Application PCT/US2008/009201 filed Jul. 30, 2008, which was published in accordance with PCT Article 21(2) on Feb. 12, 2009 in English and which claims the benefit of U.S. provisional patent application No. 60/954,256 filed Aug. 6, 2007.

TECHNICAL FIELD

The present principles relate generally to video encoding and decoding and, more particularly, to methods and apparatus for motion skip mode with multiple inter-view reference pictures.

BACKGROUND

Motion skip is a coding tool that decodes a current macroblock by reusing some of the macroblock information from its neighboring reference views. Such macroblock information that may be used includes, for example, mode, motion vectors, reference picture indexes, and reference picture lists. Since motion related information is skipped for the current macroblock, some coding gains are achieved based on the fact that pictures in the neighboring views are likely to show consistent temporal motion.

Multi-view video coding (MVC) allows multiple inter-view reference pictures. However, with respect to multi-view video coding, it is not specified how motion skip mode is to be implemented such as, for example, which view and which block to select to extract the motion information.

Motion skip mode for multi-view video coding was proposed in a first prior art approach. In order to exploit the motion similarity between the neighboring views, the motion information is inferred from the corresponding macroblock in the neighboring view picture corresponding to the same temporal instance. The disparity vectors are specified in order to locate the corresponding macroblock in the neighboring view. Later, this proposed mode was simplified in a second prior art approach. Still another mode proposed in a third prior art approach improves the coding efficiency by adaptively selecting a picture between list 0 and list 1 to obtain the corresponding macroblock. In this mode proposed in the third prior art approach, an additional syntax element is introduced to signal which list should be used to obtain corresponding macroblock.

With respect to the first prior art approach it should be noted that the motion information is always obtained from the immediately neighboring views. Even when multiple inter-view reference pictures are used, views other than the immediately neighboring view are not selected to provide the motion information. This can limit the capability of the performance of motion skip mode. For example, if the corresponding macroblocks in the immediately neighboring views are coded in Intra mode, no motion information is able to be derived from the immediately neighboring views.

SUMMARY

These and other drawbacks and disadvantages of the prior art are addressed by the present principles, which are directed to methods and apparatus for motion skip mode with multiple inter-view reference pictures.

According to an aspect of the present principles, there is provided an apparatus. The apparatus includes an encoder for encoding an image block relating to multi-view video content by performing a selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The encoder extracts motion information for the image block based on at least one of the inter-view reference picture list, the inter-view reference picture, and disparity vector.

According to another aspect of the present principles, there is provided a method. The method includes encoding an image block relating to multi-view video content. The encoding step include performing selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The encoding step also includes extracting motion information for the image block based on at least one of the inter-view reference picture list, the inter-view reference picture, and disparity vector.

According to yet another aspect of the present principles, there is provided an apparatus. The apparatus includes a decoder for decoding an image block relating to multi-view video content by performing a selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The decoder extracts motion information for the image block based on at least one of the inter-view reference picture list, the inter-view reference picture, and disparity vector.

According to still another aspect of the present principles, there is provided a method. The method includes decoding an image block relating to multi-view video content. The decoding step includes performing a selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The decoding step also includes extracting motion information for the image block based on at least one of the inter-view reference picture list, the inter-view reference picture, and disparity vector.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
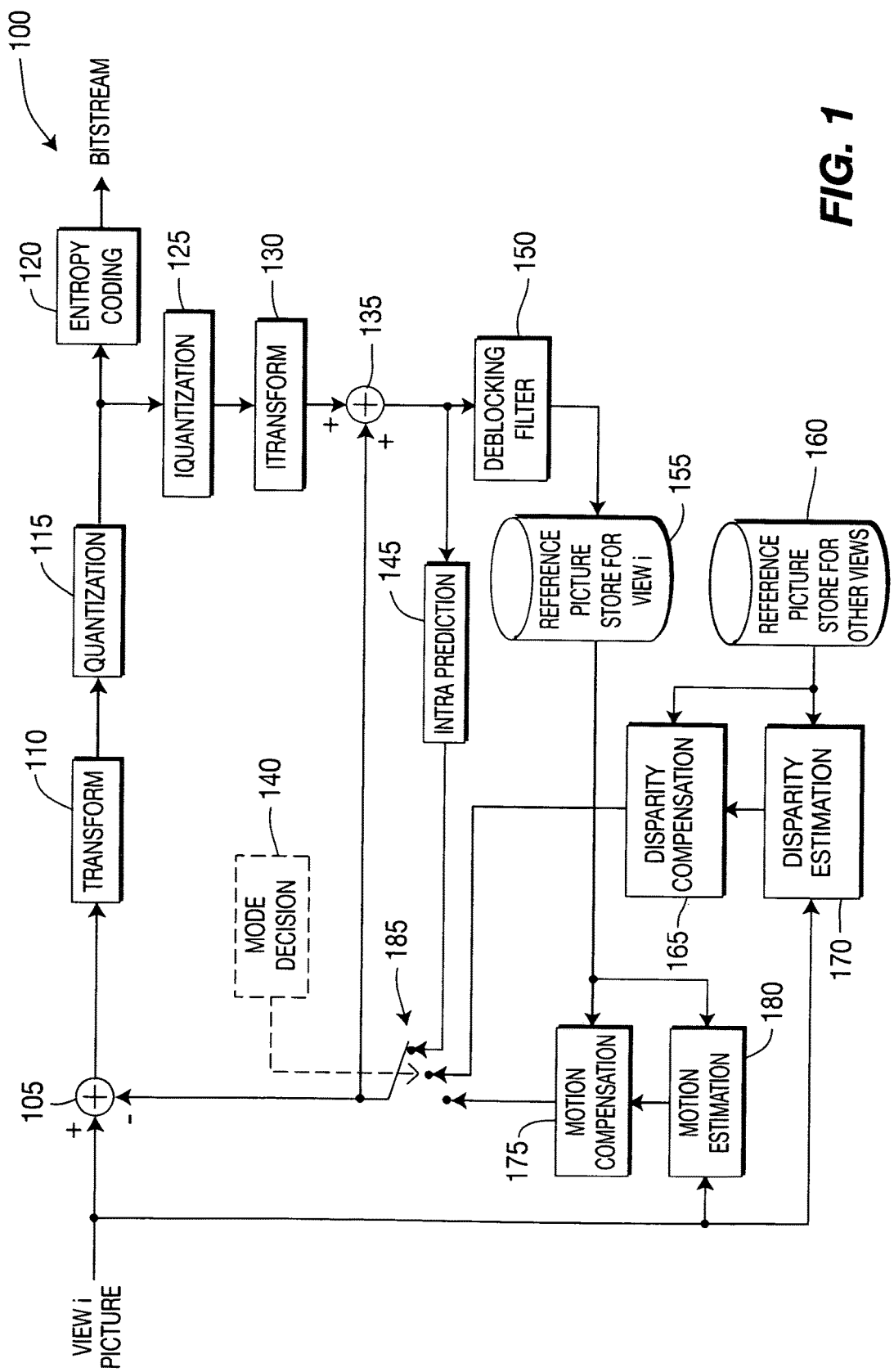
FIG. 1 is a block diagram for an exemplary Multi-view Video Coding (MVC) encoder to which the present principles may be applied, in accordance with an embodiment of the present principles.

The present principles are directed to methods and apparatus for motion skip mode with multiple inter-view reference pictures. The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Further, as interchangeably used herein, "cross-view" and "inter-view" both refer to pictures that belong to a view other than a current view.

Also, as used herein, the phrase "high level" refers to a level that resides hierarchically above the macroblock layer. For example, high level, as used herein, may refer to, but is not limited to, the slice header level, Supplemental Enhancement Information (SEI) level, Picture Parameter Set (PPS) level, Sequence Parameter Set (SPS) level, and Network Abstraction Layer (NAL) unit header level.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity estimator 170 and a first input of a disparity compensator 165. An output of the disparity estimator 170 is connected in signal communication with a second input of the disparity compensator 165.

An output of the entropy decoder 120 is available as an output of the encoder 100. A non-inverting input of the combiner 105 is available as an input of the encoder 100, and is connected in signal communication with a second input of the disparity estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity compensator 165, and a third input connected in signal communication with an output of the intra predictor 145.

A mode decision module 140 has an output connected to the switch 185 for controlling which input is selected by the switch 185.

Figure 2:
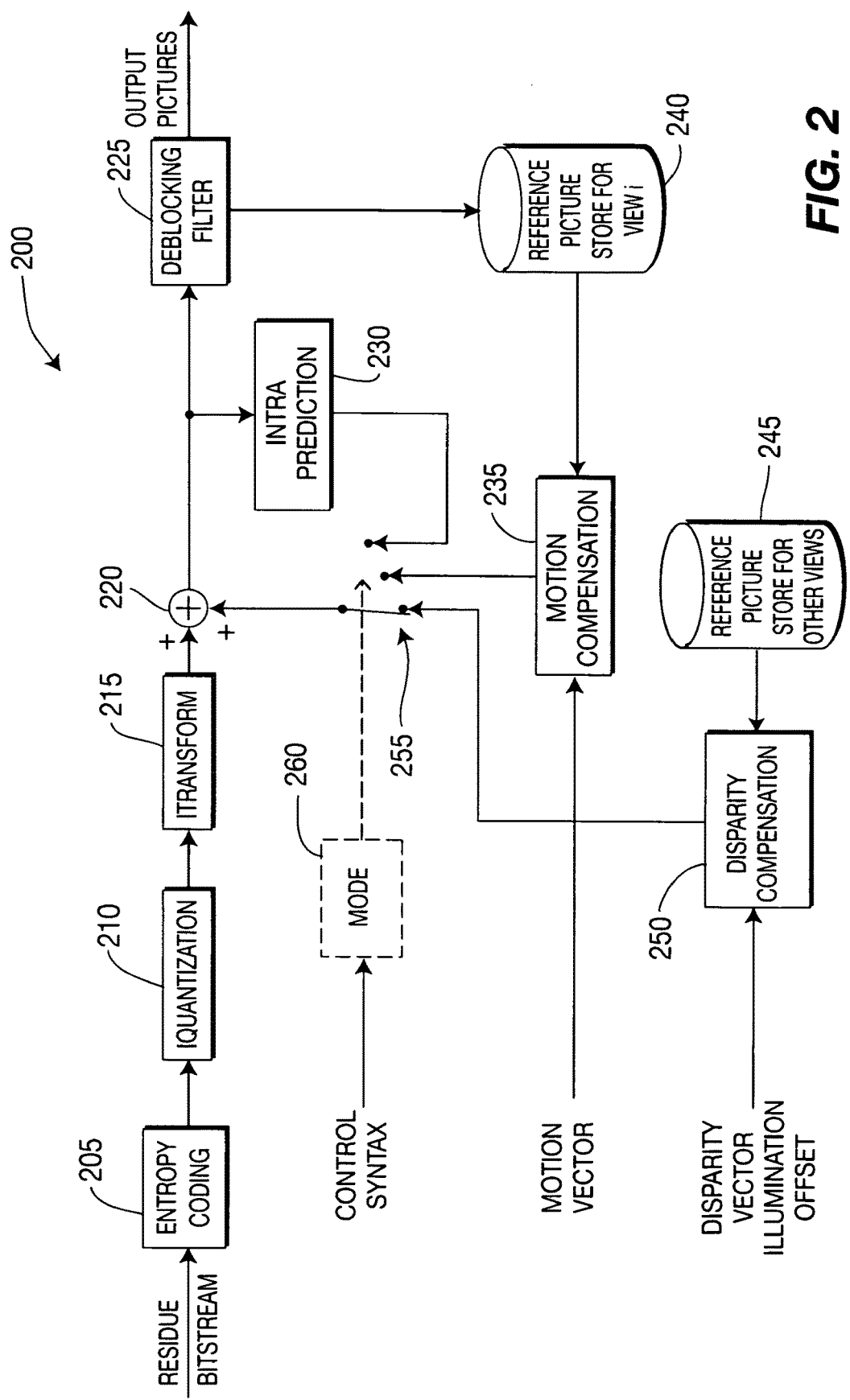
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer 210 is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity compensator 250.

An input of the entropy coder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity compensator 250 is available as an input to the decoder 200, for receiving disparity vectors syntax.

An output of a switch 255 is connected in signal communication with a second non-inverting input of the combiner 220. A first input of the switch 255 is connected in signal communication with an output of the disparity compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

As noted above, the present principles are directed to methods and apparatus for motion skip mode with multiple inter-view reference pictures.

In accordance with one or more embodiments of the present principles, we propose an extension to and adaptation of the motion skip mode proposed in the first prior art reference mentioned above. This extension and adaptation is usable in the case of multiple inter-view reference pictures.

In order to identify the corresponding macroblock in each inter-view reference picture, disparity vectors are specified for each pair of an inter-view reference picture and a current picture. The signaling can be at the macroblock level, slice level, picture level, group of pictures (GOP) level, and/or sequence level (e.g., sequence parameter set (SPS) level). For example, the disparity vectors can be specified in the slice header for only the anchor pictures, and the non-anchor pictures can either derive their disparity vectors in certain ways based on distance from the anchor picture or can simply use the disparity values from the last decoded anchor picture. Another example involves the disparity vector being encapsulated in a Supplemental Enhancement Information (SEI) message and associated to pictures. TABLE 1 shows an example where one global disparity vector is signaled for each pair of inter-view reference picture and current picture.

TABLE 1

| slice_header_mvc_extension( ) { | C | Descriptor |
|---|---|---|
|   first_mb_in_slice | 2 | ue(v) |
|   slice_type | 2 | ue(v) |
|   ic_enable | 2 | u(1) |
|   if ( anchor_pic_flag ) { | | |
|     if( slice_type = = P \|\| slice_type = = B ) { | | |
|       for( i = 0; i < num_non_anchor_refs_l0[CurrViewId]; i++ ) | | |
|         for( compIdx = 0; compIdx < 2; compIdx++ ) | | |
|           global_disparity_mb_l0 [i][ compIdx ] | 2 | se(v) |
|     } | | |
|     if(( slice_type = = B ) { | | |
|       for( i = 0; i < num_non_anchor_refs_l1[CurrViewId]; i++ ) | | |
|         for( compIdx = 0; compIdx < 2; compIdx++ ) | | |
|           global_disparity_mb_l1 [i][ compIdx ] | 2 | se(v) |
|     } | | |
|   } | | |
|   pic_parameter_set_id | 2 | ue(v) |
|   frame_num | 2 | u(v) |
|   ... | | |
| } | | |

When decoding a macroblock with motion skip mode, we need to determine which candidate disparity vector (and its associated inter-view reference picture) is to be selected to extract the motion information. Accordingly, four exemplary embodiments are provided herein describing how to handle multiple inter-view references in the context of motion skip mode. However, it is to be appreciated that the present principles are not limited solely to the four embodiments described herein, and given the teachings of the present principles provided herein, one of ordinary skill in this and related arts will contemplate these and various other embodiments and variations thereof, while maintaining the spirit of the present principles.

Figure 3:
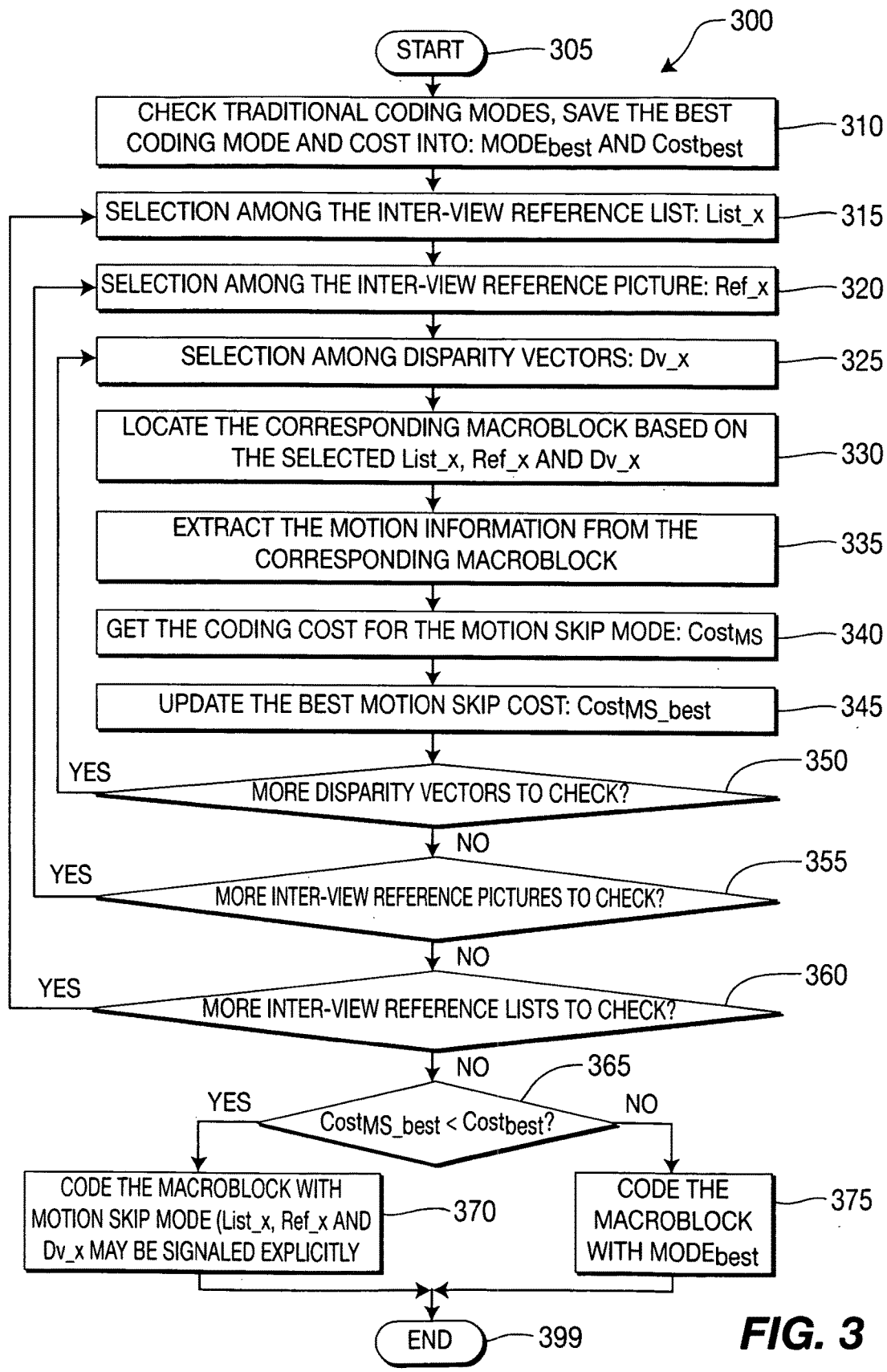
FIG. 3 is a high level flow diagram for an exemplary method for encoding multiple references using motion skip mode in accordance with an embodiment of the present principles.

Turning to FIG. 3, an exemplary encoding method for motion skip mode with multiple inter-view reference pictures is indicated generally by the reference numeral 300.

The method 300 includes a start block 305 that passes control to a function block 310. The function block 310 checks, for a current macroblock to be encoded, traditional coding modes, saves the best coding mode and cost into $MODE_{best}$ and $Cost_{best}$, and passes control to a function block 315. The function block 315 performs a selection among the inter-view reference list, the selection designated as List_x, and passes control to a function block 320. The function block 320 performs a selection among inter-view reference pictures, the selection designated as Ref_x, and passes control to a function block 325. The function block 325 performs a selection among disparity vectors, the selection designated as Dv_x, and passes control to a function block 330. The function block 330 locates the corresponding macroblock (with respect to the current macroblock) based on the selected List_x, Ref_x and Dv_x, and passes control to a function block 335. The function block 335 extracts the motion information from the corresponding macroblock, and passes control to a function block 340. The function block 340 gets the coding cost for the motion skip mode, designated as $Cost_{MS}$, and passes control to a function block 345.

The function block 345 updates the best motion skip cost, designated as $Cost_{MS\_best}$, and passes control to a decision block 350. The decision block 350 determines whether or not there are any more disparity vectors to check. If so, then control is returned to function block 325. Otherwise, control is passed to a decision block 355.

The decision block 355 determines whether or not there are any more inter-view reference pictures to check. If so, then control is returned to the function block 320. Otherwise, control is passed to a decision block 360. The decision block 360 determines whether or not there are any more inter-view reference lists to check. If so, then control is returned to the function block 315. Otherwise, control is passed to a decision block 365. The decision block 365 determines whether or not $Cost_{MS\_best}$ is less than $Cost_{best}$. If so, then control is passed to a function block 370. Otherwise, control is passed to a function block 375.

The function block 370 codes the macroblock with motion skip mode (where List_x, Ref_x, and Dv_x may be signaled explicitly), and passes control to an end block 399.

The function block 375 codes the macroblock with MODEbest, and passes control to the end block 399.

Figure 4:
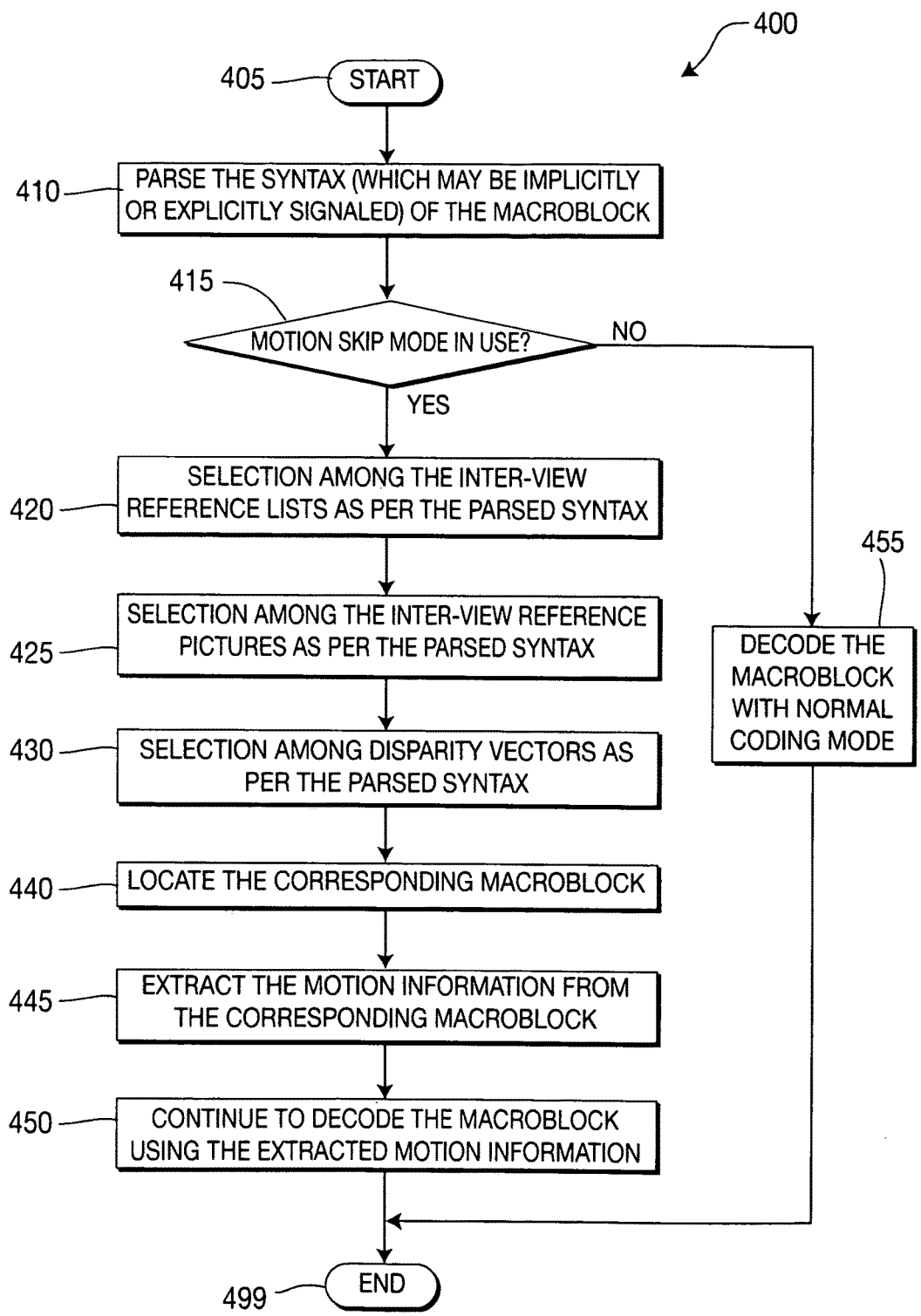
FIG. 4 is a high level flow diagram for an exemplary method for decoding multiple references using motion skip mode in accordance with an embodiment of the present principles.

Turning to FIG. 4, an exemplary decoding method for motion skip mode with multiple inter-view reference pictures is indicated generally by the reference numeral 400.

The method 400 includes a start block 405 that passes control to a function block 410. The function block 410 parses the syntax of the macroblock (which may be implicitly or explicitly signaled), and passes control to a decision block 415. The decision block 415 determines whether or not motion skip mode is in use. If so, then control is passed to a function block 420. Otherwise, control is passed to a function block 455.

The function block 420 performs a selection among the inter-view reference list as per the parsed syntax, and passes control to a function block 425. The function block 425 performs a selection among the inter-view reference pictures as per the parsed syntax, and passes control to a function block 430. The function block 430 performs a selection among disparity vectors as per the parsed syntax, and passes control to a function block 440. The function block 440 locates the corresponding macroblock based on the selections in function block 420, 425 and 430, and passes control to a function block 445. The function block 445 extracts the motion information from the corresponding macroblock, and passes control to a function block 450. The function block 450 continues to decode the macroblock using the extracted motion information, and passes control to an end block 499. The function block 455 decodes the macroblock with a normal (i.e., non-motion-skip) coding mode, and passes control to the end block 499.

A first exemplary embodiment directed to a method for handling multiple inter-view references in the context of motion skip mode will now be described.

In the first embodiment, only the global disparity vector corresponding to the closest inter-view reference for the current view is transmitted. Here, it is presumed that the closest view picture from LIST 0 and LIST 1 (when available) will be referred to derive the motion information from the inter-view reference pictures for the current view as signaled at a high level. If the corresponding macroblock in LIST 0 is an intra macroblock, LIST 1 (when available) is checked and used if the corresponding MB is not an intra macroblock. In case both LIST0 and LIST1 are present and neither is coded in Intra, LIST0 is presumed to have a higher priority over LIST1. If both lists have an intra macroblock, then motion skip mode is not selected.

Figure 5:
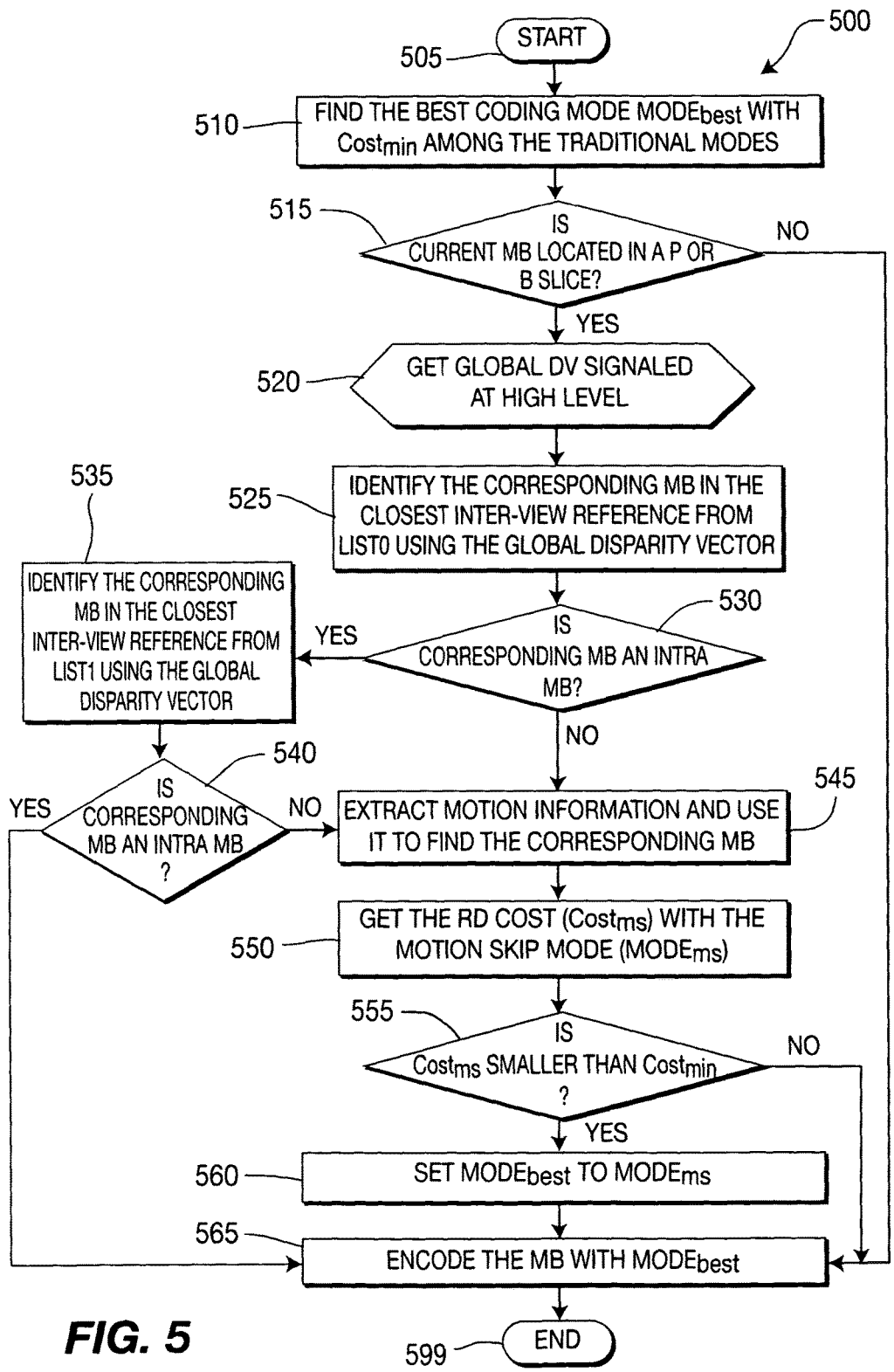
FIG. 5 is a flow diagram for another exemplary method for encoding multiple inter-view references using motion skip mode in accordance with an embodiment of the present principles.

Turning to FIG. 5, another exemplary method for encoding multiple inter-view references using motion skip mode is indicated generally by the reference numeral 500.

The method 500 includes a start block 505 that passes control to a function block 510. The function block 510 finds the best coding mode $MODE_{best}$ with $Cost_{min}$ among the traditional modes, and passes control to a decision block 515. The decision block 515 determines whether or not the current macroblock is located within a P or B slice. If so, then control is passed to a function block 520. Otherwise, control is passed to a function block 565.

The function block 520 gets the global disparity vector signaled at a high level, and passes control to a function block 525. The function block 525 identifies the corresponding macroblock in the closest inter-view reference from LIST0 using the global disparity vector, and passes control to a decision block 530. The decision block 530 determines whether or not the corresponding macroblock (identified by the function block 525) is an intra macroblock. If so, then control is passed to a function block 535. Otherwise, control is passed to a function block 545.

The function block 535 identifies the corresponding macroblock in the closest inter-view reference from LIST1 using the global disparity vector, and passes control to a decision block 540. The decision block 540 determines whether or not the corresponding macroblock (identified by the function block 535) is an intra macroblock. If so, then control is passed to a function block 565. Otherwise, control is passed to a function block 545.

The function block 565 encodes the macroblock with $MODE_{best}$, and passes control to an end block 599.

The function block 545 extracts the motion information, uses the motion information to find the corresponding macroblock, and passes control to a function block 550. The function block 550 gets the rate-distortion (RD) cost ($Cost_{ms}$) with the motion skip mode ($MODE_{ms}$), and passes control to a decision block 555. The decision block 555 determines whether or not $Cost_{ms}$ is smaller than $Cost_{min}$. If so, then control is passed to a function block 560. Otherwise, control is passed to the function block 565.

The function block 560 sets $MODE_{best}$ to $MODE_{ms}$, and passes control to the function block 565.

Figure 6:
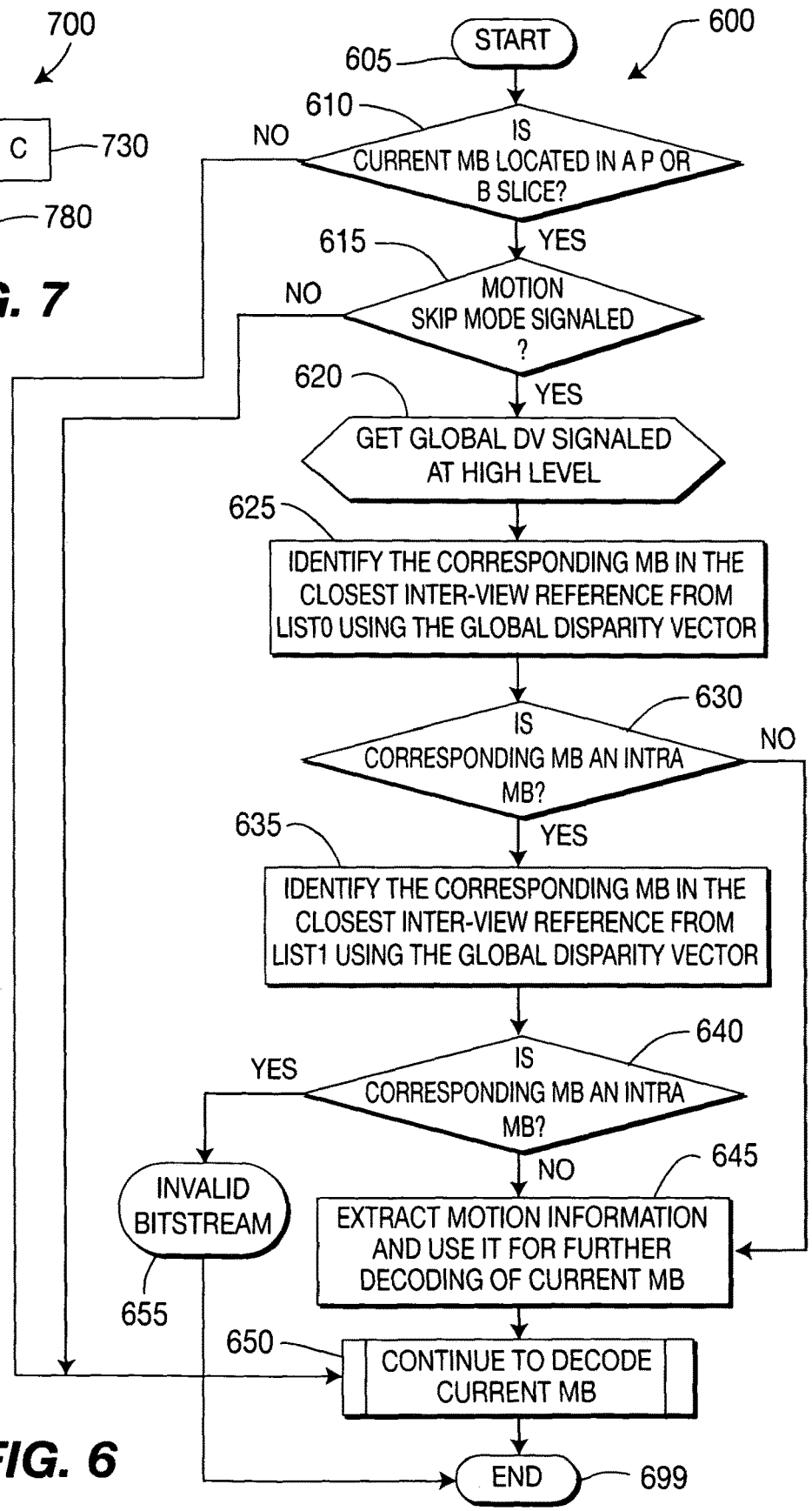
FIG. 6 is a flow diagram for another exemplary method for decoding multiple inter-view references using motion skip mode in accordance with an embodiment of the present principles.

Turning to FIG. 6, another exemplary method for decoding multiple inter-view references using motion skip mode is indicated generally by the reference numeral 600.

The method 600 includes a start block 605 that passes control to a decision block 610. The decision block 610 determines whether or not the current macroblock is located within a P slice or a B slice. If so, then control is passed to a decision block 615. Otherwise, control is passed to a function block 650.

The decision block 615 determines whether or not motion skip mode is signaled. If so, then control is passed to a function block 620. Otherwise, control is passed to the function block 650.

The function bock 620 gets the global DV signaled at a high level, and passes control to a function block 625. The function block 625 identifies the corresponding macroblock in the closest inter-view reference from LIST0 using the global disparity vector, and passes control to a decision block 630. The decision block 630 determines whether or not the corresponding macroblock is an intra macroblock. If so, then control is passed to a function block 635. Otherwise, control is passed to a function block 645.

The function block 635 identifies the corresponding macroblock in the closest inter-view reference from LIST1 using the global disparity vector, and passes control to a decision block 640. The decision block 640 determines whether or not the corresponding macroblock is an intra macroblock. If so, then control is passed to a function block 655. Otherwise, control is passed to the function block 645.

The function block 655 invalidates the bitstream, and passes control to an end block 699.

The function block 645 extracts the motion information and uses it for further decoding the current macroblock, and passes control to the function block 650.

The function block 650 continues to decode the current macroblock, and passes control to the end block 699.

A second exemplary embodiment directed to a method for handling multiple inter-view references in the context of motion skip mode will now be described.

In the second embodiment, we do not transmit a global disparity vector at a high level and also do not restrict the motion skip mode to always use a specific reference. Instead, the reference is derived from the spatially adjacent macroblocks.

Figure 7:
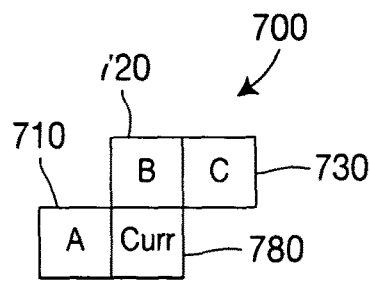
FIG. 7 is a diagram showing spatially adjacent macroblocks to which the present principles may be applied, in accordance with an embodiment of the present principles.

Turning to FIG. 7, spatially adjacent macroblocks are indicated generally by the reference numeral 700. In particular, three adjacent macroblocks of a current macroblock are indicated by the reference characters 710 (also interchangeably designated by the reference character "A"), 720 (also interchangeably designated by the reference character "B"), and 730 (also interchangeably designated by the reference character "C"), with the current macroblock indicated by the reference numeral 780 (also interchangeably designated by the reference designation "curr").

If there is one and only one macroblock from A, and B and C use inter-view prediction, then we choose that reference picture and its associated disparity vector as the disparity vector (DV) for the current macroblock. This disparity vector (DV) is then used to obtain the corresponding macroblock from the inter-view reference for motion skip mode.

If there is more than one block from A, and B and C use inter-view prediction, then we choose the inter-view reference picture with smallest reference index and its associated disparity vector. Further, if more than one block share the same inter-view reference picture, then the median disparity vector from the corresponding macroblocks will serve as the disparity vector of the current macroblock. In each case, the disparity vector may be scaled so that it points to the nearest macroblock boundary.

If no block in A, B or C use inter-view prediction, then motion skip mode is not selected.

Figure 8:
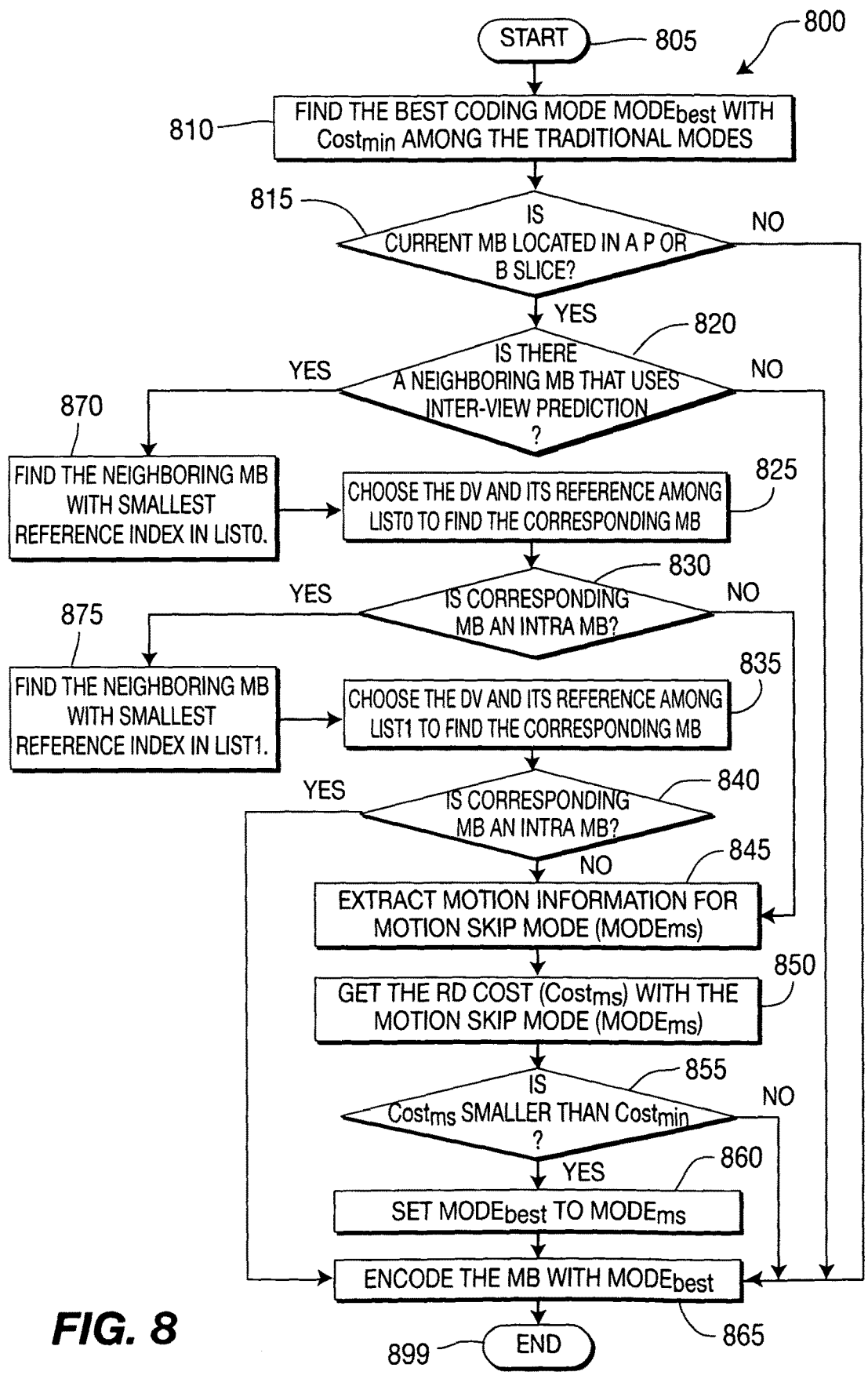
FIG. 8 is a flow diagram for yet another exemplary method for encoding multiple inter-view references using motion skip mode in accordance with an embodiment of the present principles.

Turning to FIG. 8, yet another exemplary method for encoding multiple inter-view references using motion skip mode is indicated generally by the reference numeral 800.

The method 800 includes a start block 800 that passes control to a function block 810. The function block 810 finds the best coding mode MODE$_{best}$ with Cost$_{min}$ among the traditional modes, and passes control to a decision block 815. The decision block 815 determines whether or not the current macroblock is located within a P or B slice. If so, then control is passed to a decision block 820. Otherwise, control is passed to a function block 865.

The decision block 820 determines if there is a neighboring macroblock that uses inter-view prediction. If so, then control is passed to a function block 870. Otherwise, control is passed to a function block 865.

The function block 870 finds the neighboring macroblock with the smallest reference index in LIST0, and passes control to the function block 825.

The function block 825 chooses the disparity vector (DV) and its reference among LIST0 to find the corresponding macroblock, and passes control to a decision block 830. The decision block 830 determines whether or not the corresponding macroblock is an intra macroblock. If so, then control is passed to a function block 875. Otherwise, control is passed to a function block 845.

The function block 875 finds the neighboring macroblock with the smallest reference index in LIST1, and passes control to a function block 835. The function block 835 chooses the disparity vector (DV) and its reference among LIST1 to find the corresponding macroblock, and passes control to a decision block 840. The decision block 840 determines whether or not the corresponding macroblock is an intra macroblock. If so, then control is passed to the function block 865. Otherwise, control is passed to the function block 845.

The function block 845 extracts motion information for motion skip mode (MODE$_{ms}$), and passes control to a function block 850. The function block 850 gets the rate-distortion (RD) cost (Cost$_{ms}$) with the motion skip mode (MODE$_{ms}$), and passes control to a decision block 855. The decision block 855 determines whether or not Cost$_{ms}$ is smaller than Cost$_{min}$. If so, then control is passed to a function block 860. Otherwise, control is passed to the function block 865.

The function block 860 sets MODE$_{best}$ to MODE$_{ms}$, and passes control to the function block 865. The function block 865 encodes the macroblock with MODE$_{best}$, and passes control to an end block 899.

Figure 9:
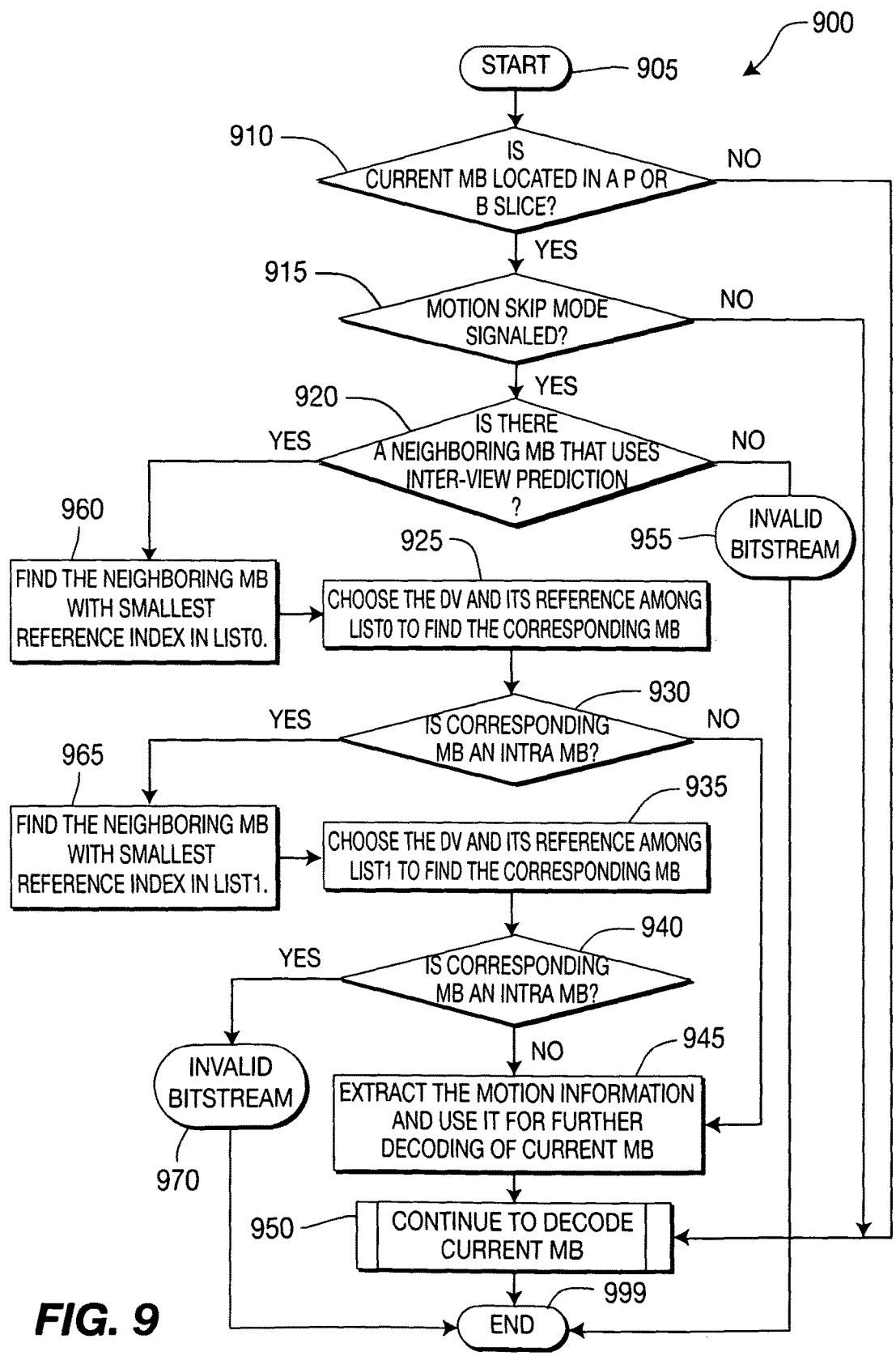
FIG. 9 is a flow diagram for yet another exemplary method for decoding multiple inter-view references using motion skip mode in accordance with an embodiment of the present principles.

Turning to FIG. 9, yet another exemplary method for decoding multiple inter-view references using motion skip mode is indicated generally by the reference numeral 900.

The method 900 includes a start block 905 that passes control to a decision block 910. The decision block 910 determines whether or not the current macroblock is located within a P slice or a B slice. If so, then control is passed to a decision block 915. Otherwise, control is passed to a function block 950.

The decision block 915 determines whether or not motion skip mode is signaled. If so, then control is passed to a decision block 920. Otherwise, control is passed to the function block 950.

The decision block 920 determines if there is a neighboring macroblock that uses inter-view prediction. If so, then control is passed to a function block 960. Otherwise, control is passed to a function block 955.

The function block 955 invalidates the bitstream, and passes control to an end block 999.

The function block 960 finds the neighboring macroblock with the smallest reference index in LIST0, and passes control to a function block 925. The function block 925 chooses the disparity vector (DV) and its reference among LIST0 to find the corresponding macroblock, and passes control to a decision block 930.

The decision block 930 determines whether or not the corresponding macroblock is an intra macroblock. If so, then control is passed to a function block 965. Otherwise, control is passed to a function block 945.

The function block 965 finds the neighboring macroblock with the smallest reference index in LIST1, and passes control to a function block 935. The function block 935 chooses the disparity vector and its reference among LIST1 to find the corresponding macroblock, and passes control to a decision block 940.

The decision block 940 determines whether or not the corresponding macroblock is an intra macroblock. If so, then control is passed to a function block 970. Otherwise, control is passed to the function block 945.

The function block 970 invalidates the bitstream, and passes control to the end block 999.

The function block 945 extracts the motion information and uses it for further decoding of the current macroblock, and passes control to the function block 950. The function block 950 continues to decode the current macroblock, and passes control to the end block 999.

A third exemplary embodiment directed to a method for handling multiple inter-view references in the context of motion skip mode will now be described.

In the third embodiment, we transmit the global disparity vector (GDV) for each of the inter-view reference pictures of the current view at a high level. In one embodiment, this may be signaled only at anchor pictures as shown in TABLE 1. In order to determine which global disparity vector to use, we will infer the view reference index from the neighboring macroblock. In one embodiment, it is derived from the spatially adjacent macroblocks. Referring again to FIG. 7, the three adjacent macroblocks of the current macroblock are shown.

Let refViewIdxLXY specify the corresponding viewIdx in List X in the sequence parameter set (SPS) uses by block Y. If block Y does not use interview prediction, then set refViewIdxLXY=−1. The output is the refViewIdxLX for block Curr. In an embodiment, the following associations may be used:

refViewIdx$L$0=MinPositive(refViewIdx$L0A$, MinPositive(refViewIdx$L0B$, reViewIdx$L0C$))

refViewIdx$L$1=MinPositive(refViewIdx$L1A$, MinPositive(refViewIdx$L1B$, refViewIdx$L1C$))

where $$MinPositive(x, y) = \begin{cases} Min(x, y) & \text{if } x >= 0 \text{ and } y >= 0 \\ Max(x, y) & \text{otherwise} \end{cases}$$

When both refViewIdxL0 and refViewIdxL1 are less than 0, we set refViewIdxL0=0, refViewIdxL1=0.

If only one of the refViewIdxLX is not less than 0, we use that list to obtain the corresponding macroblock from the inter-view reference for motion skip mode. Otherwise, the following rules are applied: We find the neighboring macroblock with the smallest reference index in LIST0 and its reference index is used to identify the inter-view reference picture and then locate the corresponding macroblock. If the corresponding macroblock is not Intra coded, then the motion information is extracted. However, if the corresponding macroblock is Intra coded, we try to use LIST1 to locate the corresponding macroblock and extract the motion information.

Figure 10:
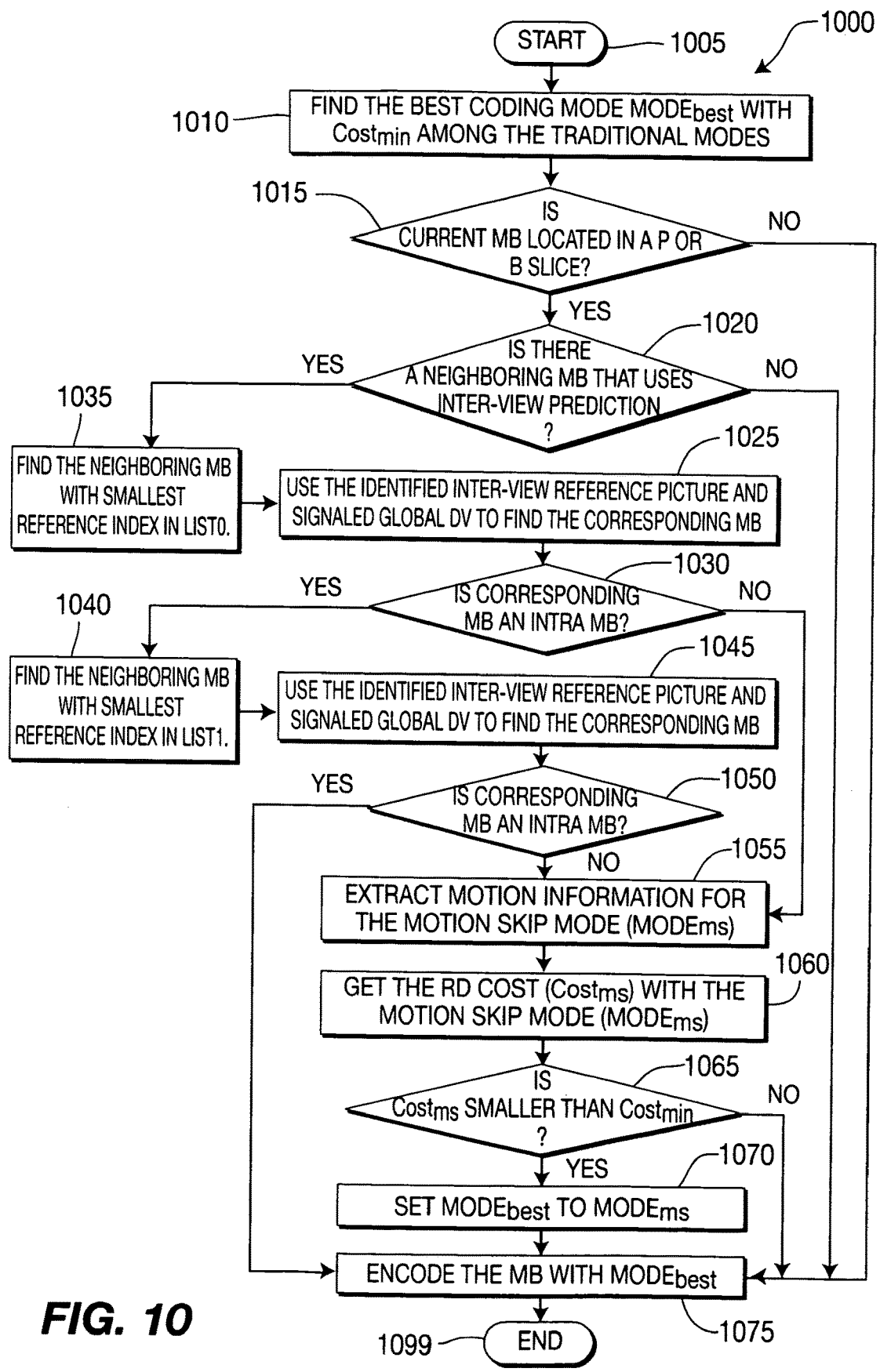
FIG. 10 is a flow diagram for still another exemplary method for encoding multiple inter-view references using motion skip mode in accordance with an embodiment of the present principles.

Turning to FIG. 10, still another exemplary method for encoding multiple inter-view references using motion skip mode is indicated generally by the reference numeral 1000.

The method 1000 includes a start block 1005 that passes control to a function block 1010. The function block 1010 finds the best coding mode $MODE_{best}$ with $COST_{min}$ among the traditional modes, and passes control to a decision block 1015. The decision block 1015 determines whether or not the current slice is a P slice or a B slice. If so, then control is passed to a decision block 1020. Otherwise, control is passed to a function block 1075.

The decision block 1020 determines if there is a neighboring macroblock that uses inter-view prediction. If so, then control is passed to a function block 1035. Otherwise, control is passed to the function block 1075.

The function block 1035 finds the neighboring macroblock with the smallest reference index in LIST0, and passes control to the function block 1025.

The function block 1025 uses the identified inter-view reference picture and signaled global disparity vector (DV) to find the corresponding macroblock, and passes control to a decision block 1030. The decision block 1030 determines whether the corresponding macroblock is an intra macroblock. If so, then control is passed to a function block 1040. Otherwise, control is passed to a function block 1055.

The function block 1040 finds the neighboring macroblock with the smallest reference index in LIST1, and passes control to the function block 1045.

The function block 1045 uses the identified inter-view reference picture and signaled global disparity vector (DV) to find the corresponding macroblock, and passes control to a decision block 1050. The decision block 1050 determines whether or not the corresponding macroblock is an intra macroblock. If so, then control is passed to the function block 1075. Otherwise, control is passed to the function block 1055.

The function block 1055 extracts the motion information for the motion skip mode ($MODE_{ms}$), and passes control to a function block 1060. The function block 1060 gets the rate-distortion (RD) cost ($Cost_{ms}$) with the motion skip mode ($MODE_{ms}$), and passes control to a decision block 1065. The decision block 1065 determines whether or not $Cost_{ms}$ is smaller than $Cost_{min}$. If so, then control is passed to a function block 1070. Otherwise, control is passed to the function block 1075.

The function block 1070 sets $MODE_{best}$ to $MODE_{ms}$, and passes control to the function block 1075.

The function block 1075 encodes the macroblock with $MODE_{best}$, and passes control to an end block 1099.

Figure 11:
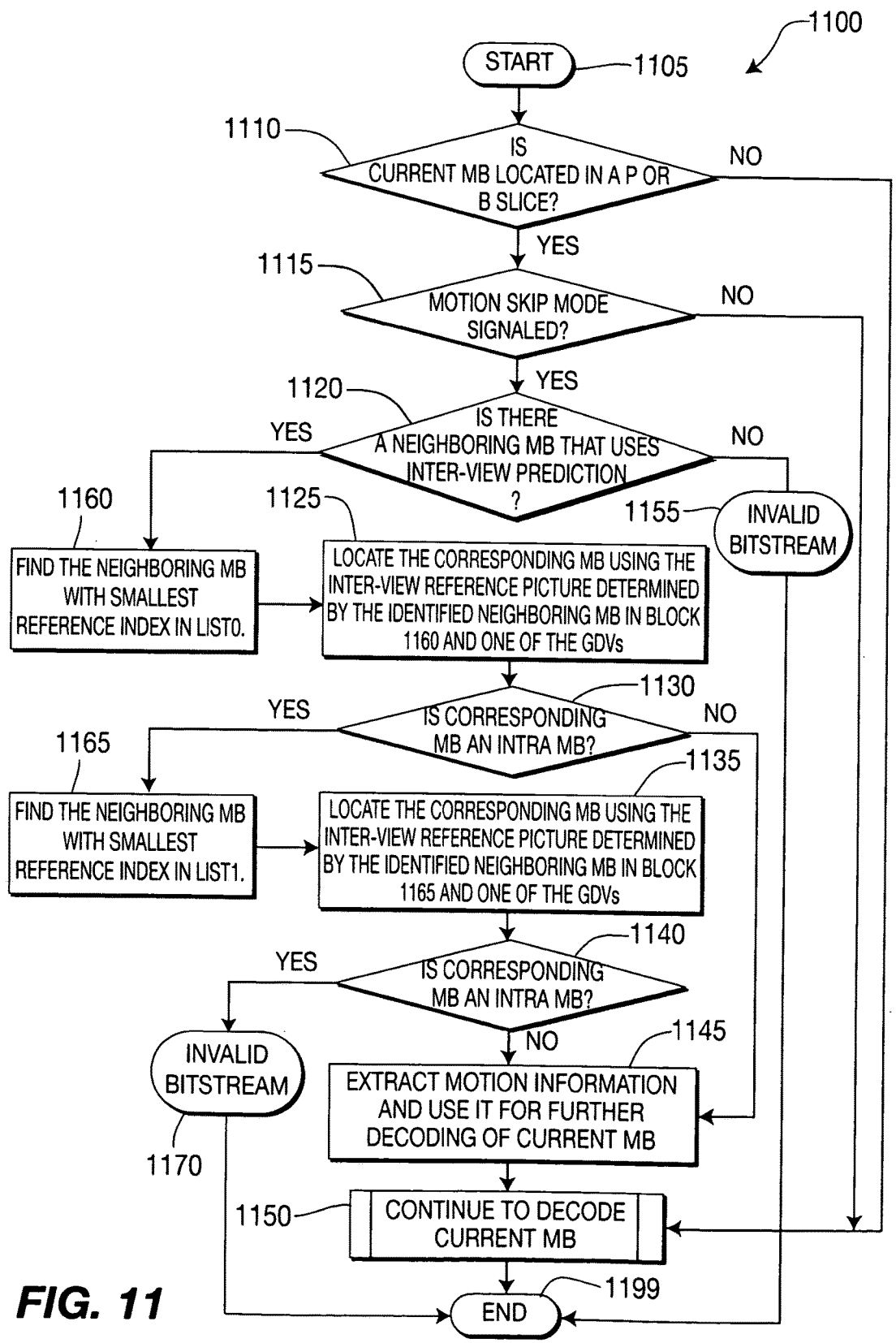
FIG. 11 is a flow diagram for still another exemplary method for decoding multiple inter-view references using motion skip mode in accordance with an embodiment of the present principles.

Turning to FIG. 11, still another exemplary method for decoding multiple inter-view references using motion skip mode is indicated generally by the reference numeral 1100.

The method 1100 includes a start block 1105 that passes control to a decision block 1110. The decision block 1110 determines whether or not the current macroblock is located within a P slice or a B slice. If so, then control is passed to a decision block 1115. Otherwise, control is passed to a function block 1150.

The decision block 1115 determines whether or not motion skip mode is signaled. If so, then control is passed to a decision block 1120. Otherwise, control is passed to the function block 1150.

The decision block 1120 determines if there is a neighboring macroblock that uses inter-view prediction. If so, then control is passed to function block 1160. Otherwise, control is passed to a function block 1155.

The function block 1155 invalidates the bitstream, and passes control to an end block 1199.

The function block 1160 finds the neighboring macroblock with the smallest reference index in LIST0, and passes control to the function block 1125.

The function block 1125 locates the corresponding MB using the inter-view reference picture determined by the identified neighboring MB in block 1160 and one of the global disparity vectors as signaled at a high level, and passes control to a decision block 1130.

The decision block 1130 determines whether or not the corresponding macroblock (identified in block 1125) is an intra macroblock. If so, then control is passed to a function block 1165. Otherwise, control is passed to a function block 1145.

The function block 1165 finds the neighboring macroblock with the smallest reference index in LIST1, and passes control to a function block 1135.

The function block 1135 locates the corresponding MB using the inter-view reference picture determined by the identified neighboring MB in block 1165 and one of the global disparity vectors as signaled at a high level, and passes control to a decision block 1140.

The decision block 1140 determines whether or not the corresponding macroblock (identified in block 1135) is an intra macroblock. If so, then control is passed to a function block 1170. Otherwise, control is passed to the function block 1145.

The function block 1170 invalidates the bitstream, and passes control to the end block 1199.

The function block 1145 extracts the motion information and uses it for further decoding of the current macroblock, and passes control to the function block 1150. The function block 1150 continues to decode the current macroblock, and passes control to the end block 1199.

A fourth exemplary embodiment directed to a method for handling multiple inter-view references in the context of motion skip mode will now be described.

In the fourth embodiment, we transmit the global disparity vector (GDV) for each of the inter-view reference pictures of the current view at a high level. In one example, this may be signaled only at anchor pictures as shown by TABLE 1. In order to determine which global disparity vector to use, the index of the corresponding global disparity vector is signaled for each macroblock coded with motion skip mode. This mode gives more flexibility and enables the encoder and/or decoder to signal any inter-view reference that result in better performance. TABLES 1 and 2 illustrate the changes proposed in accordance with one or more embodiments of the present principles, where CurrViewId is the view_id of the current decoding picture. The semantics for the proposed syntax are as follows:

list_idx when present indicates which list motion skip information is derived from list_idx equal to 0 indicates that the motion skip information should be derived from LIST0. list_idx equal to 1 indicates that the motion skip information should be derived from LIST1. When list_idx is not present, list_idx is inferred to 0.

gdv_idx when present, specifies the index of the global disparity vector in LIST0 or LIST1 to be used for motion skip mode. When gdv_idx is not present, gdv_idx is inferred to 0.

TABLE 2

| macroblock_layer( ) { | C | Descriptor |
|---|---|---|
|   if ( ! anchor_pic_flag ) { | | |
|     motion_skip_flag | 2 | u(1)|ae(v) |
|     if (motion_skip_flag) { | | |
|       if (num_non_anchor_refs_l1[CurrViewId] > 0) | | |
|         list_idx | 2 | u(1)|ae(v) |
|       if (num_non_anchor_refs_l0[CurrViewId] > 1 \|\| | | |
|         num_non_anchor_refs_l1[CurrViewId] > 1) | | |
|         gdv_idx | 2 | te(v)|ae(v) |
|     } | | |
|   } | | |
|   if (! motion_skip_flag) { | | |
|     mb_type | 2 | ue(v)|ae(v) |
|     if(mb_type == I_PCM) { | | |
|       while( !byte_aligned( ) ) | | |
|         pcm_alignment_zero_bit | 2 | f(1) |
|       for( i = 0; i < 256; i++ ) | | |
|         pcm_sample_luma[i] | 2 | u(v) |
|       for( i = 0; i < 2 * MbWidthC * MbHeightC; i++ ) | | |
|         pcm_sample_chroma[i] | 2 | u(v) |
|     } else { | | |
|       noSubMbPartSizeLessThan8x8Flag = 1 | | |
|       if( mb_type != I_NxN && | | |
|         MbPartPredMode( mb_type, 0 ) != Intra_16x16 && | | |
|         NumMbPart( mb_type ) == 4 ) { | | |
|         sub_mb_pred( mb_type ) | 2 | |
|         for( mbPartIdx = 0; mbPartIdx < 4; mbPartIdx++ ) | | |
|           if( sub_mb_type[ mbPartIdx ] != B_Direct_8x8 ) { | | |
|             if( NumSubMbPart( sub_mb_type[ mbPartIdx ] ) > 1) | | |
|               noSubMbPartSizeLessThan8x8Flag = 0 | | |
|           } else if( !direct_8x8_inference_flag ) | | |
|             noSubMbPartSizeLessThan8x8Flag = 0 | | |
|       } else { | | |
|         if( transform_8x8_mode_flag && mb_type == I_NxN) | | |
|           transform_size_8x8_flag | 2 | u(1)|ae(v) |
|         mb_pred( mb_type ) | 2 | |
|       } | | |
|     } | | |
|   } | | |
|   /*remaining part is same as in JMVM*/ | | |
| } | | |

Figure 12:
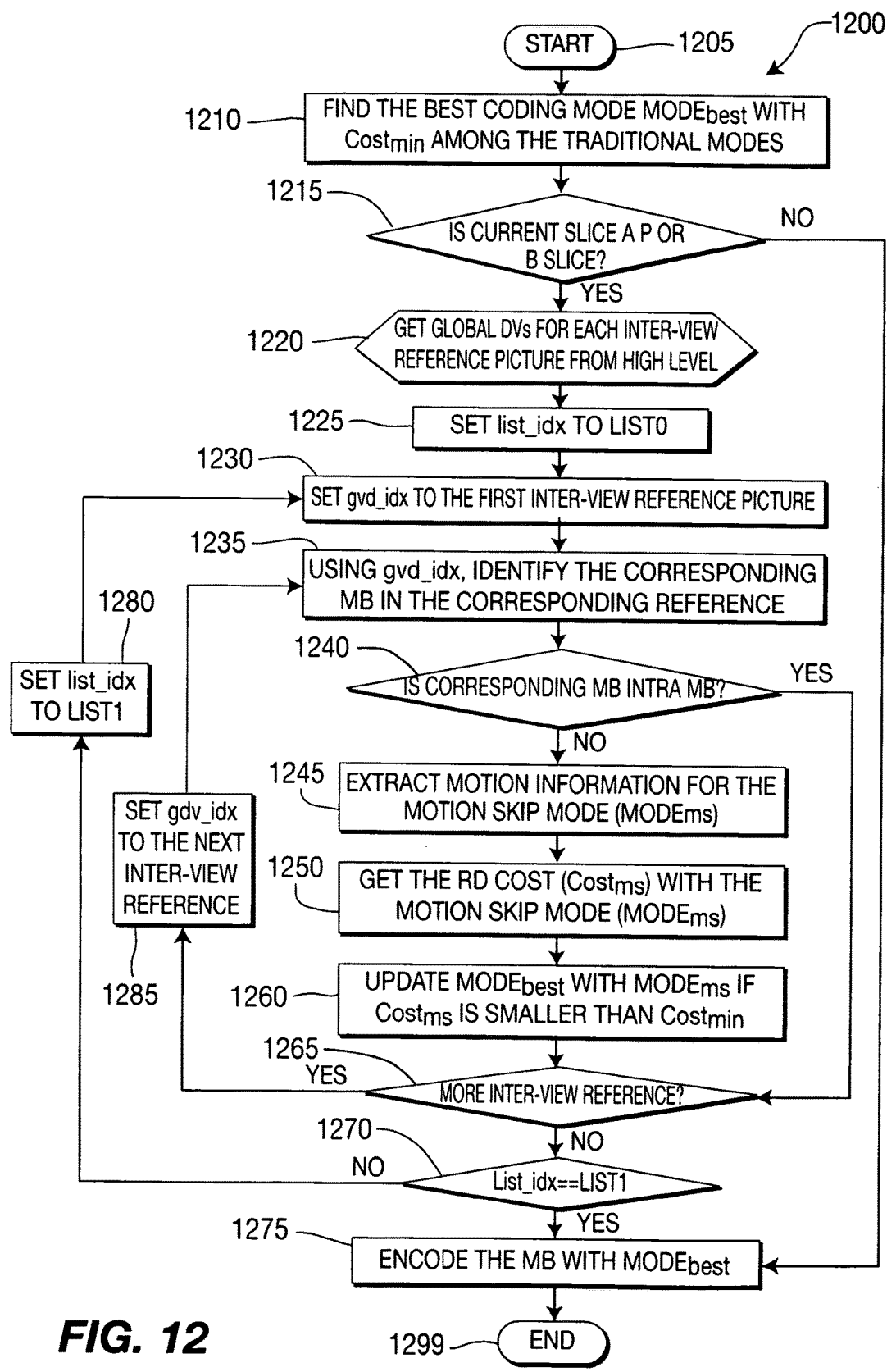
FIG. 12 is a flow diagram for a further exemplary method for encoding multiple inter-view references using motion skip mode in accordance with an embodiment of the present principles.

Turning to FIG. 12, a further exemplary method for encoding multiple inter-view references using motion skip mode is indicated generally by the reference numeral 1200.

The method 1200 includes a start block 1205 that passes control to a function block 1210. The function block 1210 finds the best coding mode $MODE_{best}$ with $COST_{min}$ among the traditional modes, and passes control to a decision block 1215. The decision block 1215 determines whether or not the current slice is a P slice or a B slice. If so, then control is passed to a function block 1220. Otherwise, control is passed to a function block 1275.

The function block 1220 gets the global disparity vectors (DVs) for each inter-view reference picture from a high level, and passes control to a function block 1225. The function block 1225 sets list_idx equal to LIST0, and passes control to a function block 1230. The function block 1230 sets gdv_idx to the first inter-view reference picture, and passes control to a function block 1235. The function block 1235 uses gdv_idx to identify the corresponding macroblock in the corresponding reference, and passes control to a decision block 1240. The decision block 1240 determines whether the corresponding macroblock is an intra macroblock. If so, then control is passed to a decision block 1265. Otherwise, control is passed to a function block 1245.

The function block 1245 extracts the motion information for the motion skip mode ($MODE_{ms}$), and passes control to a function block 1250. The function block 1250 gets the rate-distortion (RD) cost ($Cost_{ms}$) with the motion skip mode ($MODE_{ms}$), and passes control to a function block 1260. The function block 1260 updates $MODE_{best}$ with $MODE_{ms}$ if $Cost_{ms}$ is smaller than $Cost_{min}$, and passes control to a decision block 1265. The decision block 1265 determines whether or not there are any more inter-view references. If so, then control is passed to a function block 1285. Otherwise, control is passed to a decision block 1270.

The function block 1285 sets gdv_idx to the next inter-view reference, and returns control to the function block 1235.

The decision block 1270 determines whether or not list_idx is equal to LIST1. If so, then control is passed to the function block 1275. Otherwise, control is passed to a function block 1280.

The function block 1275 encodes the macroblock with $MODE_{best}$, and passes control to an end block 1299.

The function block 1280 sets list_idx equal to LIST1, and returns control to the function block 1230.

Figure 13:
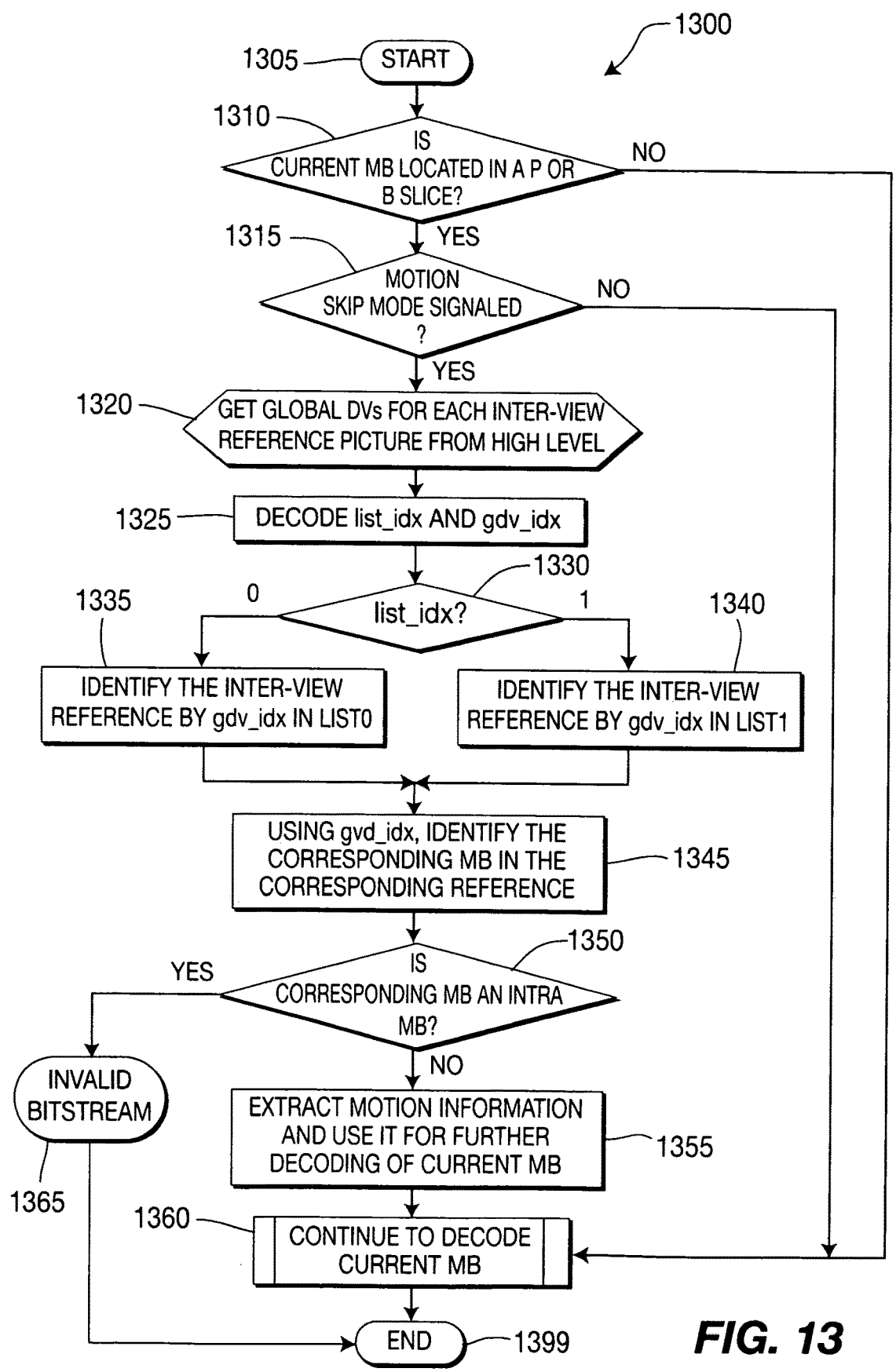
FIG. 13 is a flow diagram for a further another exemplary method for decoding multiple inter-view references using motion skip mode in accordance with an embodiment of the present principles.

Turning to FIG. 13, a further exemplary method for decoding multiple inter-view references using motion skip mode is indicated generally by the reference numeral 1300.

The method 1300 includes a start block 1305 that passes control to a decision block 1310. The decision block 1310 determines whether or not the current macroblock is located within a P slice or a B slice. If so, then control is passed to a decision block 1315. Otherwise, control is passed to a function block 1360.

The decision block 1315 determines whether or not motion skip mode is signaled. If so, then control is passed to a function block 1320. Otherwise, control is passed to the function block 1360.

The function block 1320 gets the global disparity vectors for each inter-view reference picture from a high level, and passes control to a function block 1325. The function block 1325 decodes list_idx and gdv_idx, and passes control to a decision block 1330. The decision block 1330 determines whether list_idx is equal to zero or is equal to one. If list_idx is equal to zero, then control is passed to a function block 1335. Otherwise, if list_idx is equal to one, then control is passed to a function block 1340.

The function block 1335 identifies the inter-view reference by gdv_idx in LIST0, and passes control to the function block 1345.

The function block 1340 identifies the inter-view reference by gdv_idx in LIST1, and passes control to the function block 1345.

The function block 1345 using gdv_idx, identifies the corresponding macroblock in the corresponding reference, and passes control to a decision block 1350. The decision block 1350 determines whether or not the corresponding macroblock (identified by function block 1345) is an intra macroblock. If so, then control is passed to a function block 1365. Otherwise, control is passed to a function block 1355.

The function block 1365 invalidates the bitstream, and passes control to an end block 1399.

The function block 1355 extracts the motion information and uses it for further decoding of the current macroblock, and passes control to a function block 1360.

The function block 1360 continues to decode the current macroblock, and passes control to an end block 1399.

A description will now be given of some of the many attendant advantages/features of the present invention, some of which have been mentioned above. For example, one advantage/feature is an apparatus that includes an encoder for encoding an image block relating to multi-view video content by performing a selection, for the image block, of at least one of an inter-view reference picture list from a set of inter-view reference picture lists, an inter-view reference picture from among a set of inter-view reference pictures, and a disparity vector from among a set of disparity vectors corresponding to the inter-view reference picture. The encoder extracts motion information for the image block based on at least one of the inter-view reference picture list, the inter-view reference picture, and disparity vector.

Another advantage/feature is the apparatus having the encoder as described above, wherein the selection of at least one of the inter-view reference picture list, the inter-view reference picture, and the disparity vector is implicit.

Yet another advantage/feature is the apparatus having the encoder wherein the selection is implicit as described above, wherein the image block corresponds to a current view of the multi-view video content, and the selection corresponds to one of a first case, a second case, a third case, and a fourth case. The first case has the selection of the inter-view reference picture being explicit. The second case has the inter-view reference picture closest to the current view being selected. The third case has the inter-view reference picture and the disparity vector being selected based on neighboring macroblocks with respect to the image block. The fourth case has the disparity vector being explicitly transmitted at a high level and only at least one of the inter-view reference picture list and the inter-view reference picture being selected based on the neighboring macroblocks.

Still another advantage/feature is the apparatus having the encoder as described above, wherein the inter-view reference picture that is selected corresponding to the second case is a first inter-view reference picture specified in the inter-view reference picture list that is selected.

Moreover, another advantage/feature is the apparatus having the encoder as described above, wherein the neighboring macroblocks include a left macroblock, a top macroblock, and a top right macroblock, and the selection corresponding to the third case further corresponds to when at least one of the neighboring macroblocks uses only inter-view prediction and the inter-view reference picture that is selected has a smallest index value from among inter-view reference pictures in the set of inter-view reference pictures that correspond to the at least one of the neighboring macroblocks.

Further, another advantage/feature is the apparatus having the encoder as described above, wherein the selection corresponding to the fourth case further corresponds to when at least one of the neighboring macroblocks uses only inter-view prediction and the inter-view reference picture that is selected has the smallest index value from among inter-view reference pictures in the set of inter-view reference pictures that correspond to the at least one of the neighboring macroblocks.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising an encoder for encoding an image block relating to multi-view video content, said apparatus comprising further comprising a processor configured to:
   i) select, for the image block, an inter-view reference picture list from a set of two inter-view reference picture lists, an inter-view reference picture from said selected inter-view reference picture list, and a disparity vector from among a set of disparity vectors corresponding to said selected inter-view reference picture, the inter-view reference picture and the disparity vector being selected based on neighboring macroblocks with respect to the image block;
   ii) identify a corresponding inter-view block based on said selected inter-view reference picture list, said selected inter-view reference picture, and said selected disparity vector; and
   iii) extract motion information for the image block from the corresponding inter-view block;
   wherein said selecting comprises, when more than one neighboring macroblock use inter-view prediction, selecting, from inter-view reference pictures associated with said neighboring macroblocks, an inter-view picture with the smallest reference index and its associated disparity vector.

2. A method, comprising encoding an image block relating to multi-view video content, wherein said encoding comprises:
   i) performing a selection, for the image block, of an inter-view reference picture list from a set of two inter-view reference picture lists, an inter-view reference picture from said selected inter-view reference picture list, and a disparity vector from among a set of disparity vectors corresponding to said selected inter-view reference picture, the inter-view reference picture and the disparity vector being selected based on neighboring macroblocks with respect to the image block;
   ii) identifying a corresponding inter-view block based on said selected inter-view reference picture list, said selected inter-view reference picture, and said selected disparity vector; and
   iii) extracting motion information for the image block from the corresponding inter-view block;
   wherein said selecting comprises, when more than one neighboring macroblock use inter-view prediction, selecting, from inter-view reference pictures associated with said neighboring macroblocks, an inter-view picture with the smallest reference index and its associated disparity vector.

3. An apparatus, comprising a decoder for decoding an image block relating to multi-view video content, said apparatus further comprising a processor to:
   i) select, for the image block, an inter-view reference picture list from a set of two inter-view reference picture lists, an inter-view reference picture from said selected inter-view reference picture list, and a disparity vector from among a set of disparity vectors corresponding to said selected inter-view reference picture, the inter-view reference picture and the disparity vector being selected based on neighboring macroblocks with respect to the image block;
   ii) identify a corresponding inter-view block based on said selected inter-view reference picture list, said selected inter-view reference picture, and said selected disparity vector; and
   iii) extract motion information for the image block from the corresponding inter-view block,
   wherein said selecting comprises, when more than one neighboring macroblock use inter-view prediction, selecting (960,965), from inter-view reference pictures associated with said neighboring macroblocks, an inter-view picture with the smallest reference index and its associated disparity vector.

4. A method, comprising decoding an image block relating to multi-view video content, wherein said decoding comprises:
   i) performing a selection, for the image block, of an inter-view reference picture list from a set of two inter-view reference picture lists, an inter-view reference picture from said selected inter-view reference picture list, and a disparity vector from among a set of disparity vectors corresponding to said selected inter-view reference picture, the inter-view reference picture and the disparity vector being selected based on neighboring macroblocks with respect to the image block;
   ii) identifying a corresponding inter-view block based on said selected inter-view reference picture list, said selected inter-view reference picture, and said selected disparity vector, and
   iii) extracting motion information for the image block from the corresponding inter-view block,
   wherein said selecting comprises, when more than one neighboring macroblock use inter-view prediction, selecting, from inter-view reference pictures associated with said neighboring macroblocks, an inter-view picture with the smallest reference index and its associated disparity vector.

* * * * *